UNITED STATES PATENT OFFICE.

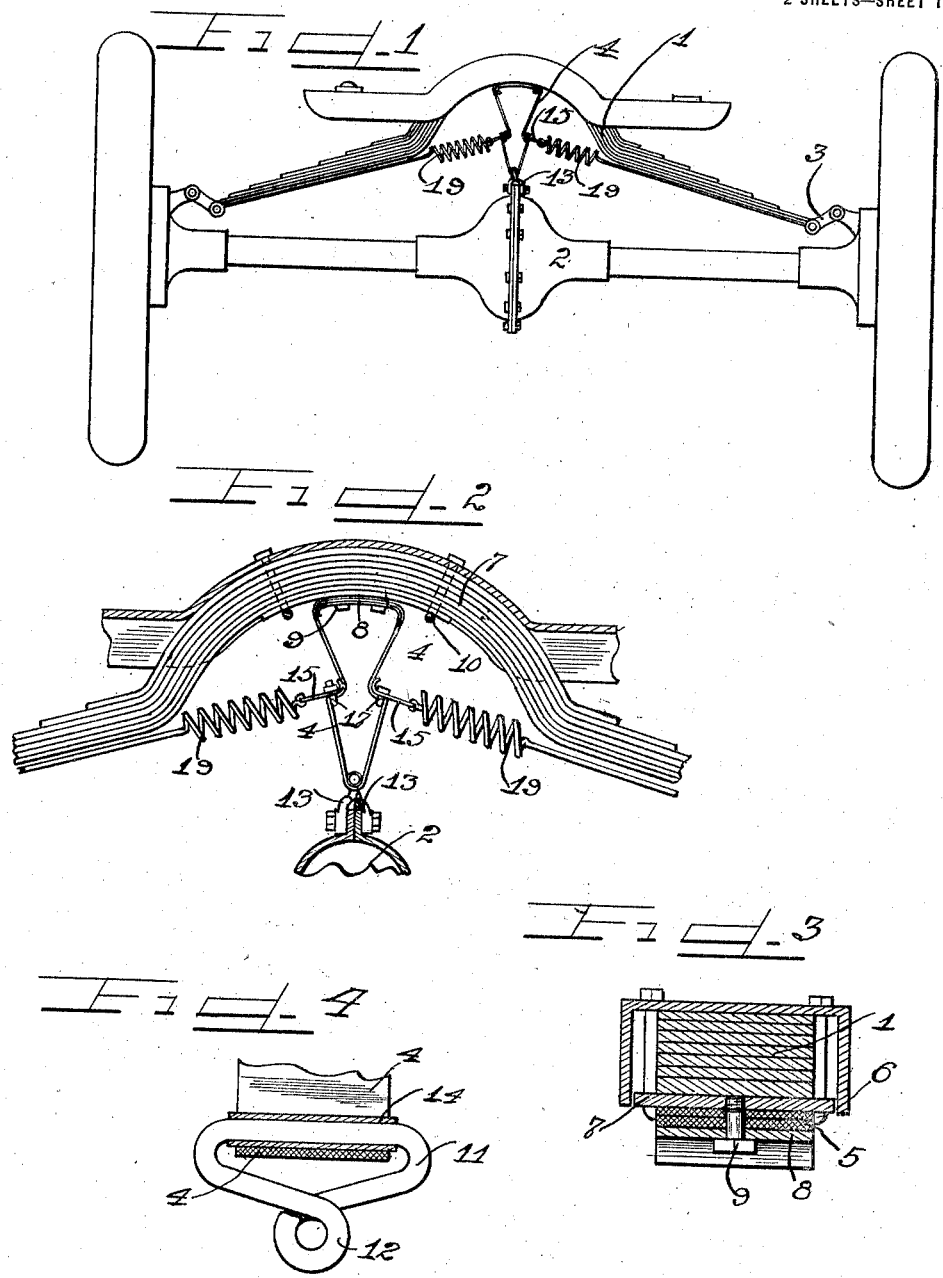

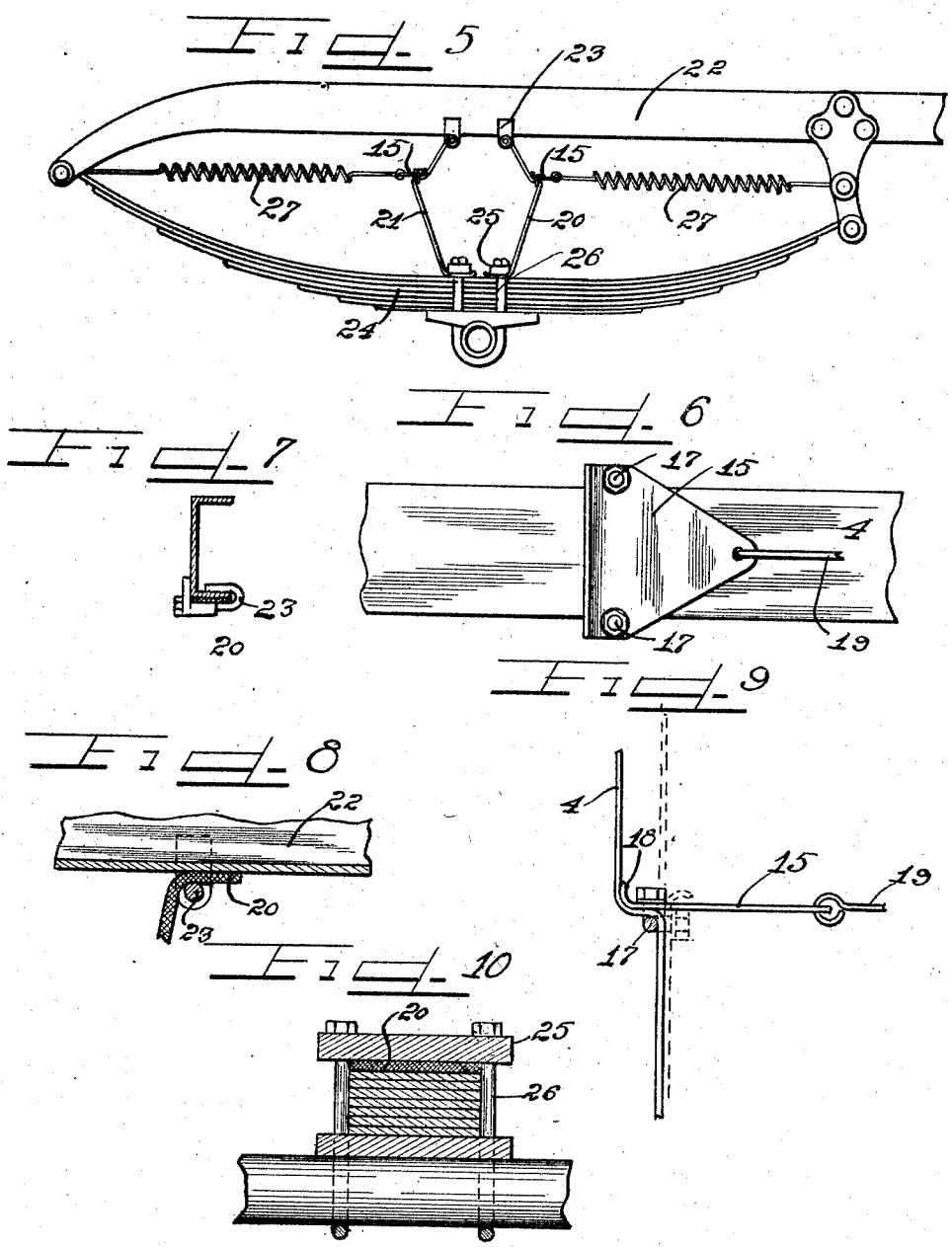

NATHAN SCHACHTER, OF CHICAGO, ILLINOIS.

SHOCK-ABSORBER.

1,307,759.　　　　Specification of Letters Patent.　　Patented June 24, 1919.

Application filed September 4, 1917. Serial No. 189,583.

*To all whom it may concern:*

Be it known that I, NATHAN SCHACHTER, a former subject of the King of Roumania, who have declared my intention of becoming a citizen of the United States, and a resident of the city of Chicago, in the county of Cook and State of Illinois, have invented certain new and useful Improvements in Shock-Absorbers; and I hereby declare that the following is a full, clear, and exact description of the same, reference being had to the accompanying drawings, and to the numerals of reference marked thereon, which form a part of this specification.

This invention relates to improvements in shock absorbers.

Shock absorbers or snubbers as heretofore constructed have proven objectionable and not altogether satisfactory owing to the fact that the release of the device is too slow. Thus in a series of shocks in quick succession the springs are compressed and the absorber prevents the spring from returning to normal after each shock with the result that the shock is delivered directly to the body of the car. This is especially true of the piston type and belt snubbers. These devices may act satisfactorily where the shocks occur at sufficient intervals apart but as before stated quick return of the parts is not permitted.

It is an object of this invention to provide a shock absorber or snubber which permits quick and easy recoil of the springs and at the same time prevents the springs from snapping back with sufficient severity to injure them.

It is further an object of this invention to provide a shock absorber or snubber which is adapted to rapidly cushion the recoil of the springs no matter how quickly the succession of shocks may occur and with which a full recoil of the springs to normal is permitted between each shock.

It is further an object of this invention to provide a shock absorber or snubber in which the leverage principle is utilized to thereby provide an exceedingly high power absorber with the use of medium sized parts.

It is further an object of this invention to provide a shock absorber which is adapted to equalize the pressure when one side of the car is over loaded and in which the snubber for each side of the car directly coacts and is interconnected to operate together for the purpose of absorbing the shock.

It is also an object of this invention to provide a snubber which may be quickly attached without requiring the drilling of any extra holes or any complicated parts.

Other and further objects of this invention will be apparent from the disclosures in the drawings and specification.

The invention (in a preferred form) is illustrated in the drawings and hereinafter more fully described.

On the drawings:

Figure 1 is a view of a shock absorber or snubber embodying my invention attached to a car using transverse springs.

Fig. 2 is an enlarged fragmentary detail thereof.

Fig. 3 is a sectional view illustrating the method of attaching the belting to the center of the spring.

Fig. 4 is an enlarged detail illustrating the means for attaching the webbing or belt to the gear housing.

Fig. 5 is a modified form of shock absorber showing the same attached to springs extending longitudinally of the car.

Fig. 6 illustrates the lever plate for attaching the absorber spring to the belting.

Fig. 7 illustrates the method of attaching the end of the web to the channel frame member.

Fig. 8 is a view taken at right angles with Fig. 7.

Fig. 9 is an enlarged fragmentary detail illustrating the means for connecting the lever plate to the web.

Fig. 10 is a sectional view showing the manner of securing the ends of the web to the car springs.

As shown on the drawings:

1, indicates the spring, 2 the differential housing and 3 the knuckle or link connecting the ends of spring 1, to the brake housing.

Rigidly secured to the center of the spring 1, is a belt or web of canvas 4, which may be continuous or have the ends 5—6, overlapped and clamped between a plate or shoe 7, and a shoe 8, by means of screw bolts 9. The shoe 7, is rigidly attached to the springs 1, by the usual U bolts 10.

A link 11, engages the bight of the web and is provided with an eye 12, in which engage the fingers 13, which are in turn secured to the gear housing 2. An anti-friction sleeve 14, is provided on the link on which the web runs.

Rigidly secured to opposite sides of the web 4, are lever plates 15, by means of a U bolt 17.

As shown clearly the lever plate is V shaped and the inner wide end 18, thereof is curved to prevent wearing the webbing and the outer end is apertured.

An absorber spring 19, is connected at one end to the lever plate 15, and at its opposite end to the link or knuckle 3, in any suitable manner.

The construction shown in Figs. 5 to 10, differs from the foregoing only in details of construction. As shown, two independent webs 20—21, are used, one end of which is attached to the channel frame 22, by means of a clamp 23, and the opposite end of each web is attached centrally to the spring 24, by means of a shoe 25, and U bolts 26.

The springs 27, are attached to the lever plates 15, before described and the lever plates in turn are connected to the web members.

The operation is as follows:

The web or web members are attached to the frame and spring, and the absorber springs connected to the lever plates and knuckle links of the car, under tension.

As the spring of the car compresses under shock the pulling springs 19 or 27, contract taking up all slack in the web and permitting quick return of the spring to normal but upon the spring attempting to recoil past normal the web members 20—21 or 4, are straightened out which in turn swing the lever plates 15, toward the position shown in dotted lines in Fig. 9. The movement of the lever plates in turn rocks the springs which is resisted by the increasing tension of the springs 19 or 27, and owing to the leverage of the lever 15, a powerful resistance is offered against the rebound of the main spring and body thereby absorbing the shock.

Furthermore as the lever 15, normally extends in the direction of the tension exerted by the springs 19 or 27, and the straightening of the flexible member 4 or 20, moves the outer end of the lever, which is connected to the spring, in a circular path against the tension of the spring, the leverage of the arm 15, or arm of pressure thereof, constantly increases as it moves from the normal position and exerts a rapidly increasing resistance to the straightening of the flexible member. On the other hand the reverse end 18, of the lever 15, which engages the flexible member, is in the normal position substantially at right angles to the direction of the pull exerted by the flexible member, and is moved thereby in a circular path and the leverage thereof or arm of pressure is diminished by such movement. This action of the arm of the lever 15, permits a light spring 19 or 27, to be used which initially offers a slight resistance which rapidly multiplies to resist straightening of the flexible member and effectively limits and absorbs the rebound of the main spring without perceptible effect on the occupants of the vehicle.

It is thus seen that a very quick acting shock absorber is provided and one which exerts a powerful resistance against the recoil to absorb the severe shocks.

In the construction shown in Figs. 1 to 5, by using a continuous web over the anti-friction sleeve 14, the weight of the load is equalized, for should one side of the load be heavier than the other, the cant of the load varies the position of the bight of the web and the swinging pulling springs keep the web taut.

Many details of construction may be varied and numerous changes may be made without departing from the principles of my invention and I therefore do not desire to limit my patent otherwise than necessitated by the prior art.

I claim as my invention:

1. A shock absorber comprising a flexible web, lever members secured thereto and pulling springs connected to said levers.

2. A shock absorber comprising a flexible member, lever plates secured thereto and pulling springs secured to the lever plates.

3. In a device of the class described, the combination with a vehicle spring, chassis and connecting links, of flexible web members attached at their ends to the spring and chassis, and springs extending transversely of the web members connected at their inner ends to the web members and at their outer ends to the links.

4. In a device of the class described the combination with a chassis and springs, of a flexible web member having its ends rigidly secured to the spring, anti-friction means connecting the bight of the web to the chassis, a plurality of pulling springs connected at their outer ends to the chassis and means connecting the inner ends of the pulling springs to the web member adapted to exert a leverage on the pulling springs.

5. The combination with a pair of relatively movable parts and a main spring yieldingly connecting said parts, of a shock absorber comprising a lever having the fulcrum connected with one of said parts, a spring connected with one of the arms of the lever, and means for operatively connecting the other arm of the lever to the other part.

6. The combination with a pair of relatively movable parts, and a main spring yieldingly connecting said parts, of a shock absorber comprising a lever, flexible means for connecting the fulcrum of the lever with one of said parts, a spring connected with one of the arms of the levers, and flexible means for operatively connecting the other arm of the lever with the other of said parts.

7. The combination with a pair of resiliently connected relatively movable vehicle parts, of a shock absorber therefor, comprising a lever having the fulcrum thereof connected with one of said parts and having a long and a short lever arm, means for operatively connecting the short lever arm with the other vehicle part so that the lever is swung on its fulcrum by relative movement of the vehicle parts, and a spring connected with the long arm of the lever so as to resist swinging movement of the lever.

8. The combination with a pair of relatively movable resiliently connected vehicle parts, of a shock absorber therefor, comprising a flexible member operatively connecting the said vehicle parts, means for deforming the flexible member intermediate of its ends, and a spring coöperating therewith to resist relative movement of the vehicle parts.

9. The combination with a pair of relatively movable resiliently connected vehicle parts, of a shock absorber therefor, comprising a looped flexible member connected with one of the vehicle parts and intermediately loosely connected with the other vehicle part, and a spring connected with each side member of the loop.

10. The combination with a pair of relatively movable resiliently connected vehicle parts, of a shock absorber therefor comprising a pair of members having an equalizer connection with one of said vehicle parts, and a spring connected with each member for independently controlling the relative movement of the vehicle parts.

In testimony whereof I have hereunto subscribed my name in the presence of two subscribing witnesses.

NATHAN SCHACHTER.

Witnesses:
CHARLES W. HILLS, Jr.,
EARL M. HARDINE.

Copies of this patent may be obtained for five cents each, by addressing the "Commissioner of Patents, Washington, D. C."